Jan. 4, 1949.    W. A. MORRISON    2,458,289
ROCK DRILL
Filed March 13, 1946

INVENTOR
William A. Morrison
BY
HIS ATTORNEY.

Patented Jan. 4, 1949

2,458,289

UNITED STATES PATENT OFFICE 2,458,289

ROCK DRILL

William A. Morrison, Easton, Pa., assignor to Ingersoll-Rand Company, New York, N. Y., a corporation of New Jersey Application March 13, 1946, Serial No. 654,057

2 Claims. (Cl. 121—7)

This invention relates to rock drills, and more particularly to the front-end internal parts of a rock drill serving to transmit driving force to the working implement.

One object of the invention is to simplify and reduce the number of parts required for actuating the working implement.

Another object is to minimize the cost of maintenance of the power-transmitting parts of a rock drill.

Other objects will be in part obvious and in part pointed out hereinafter.

Figure 1:
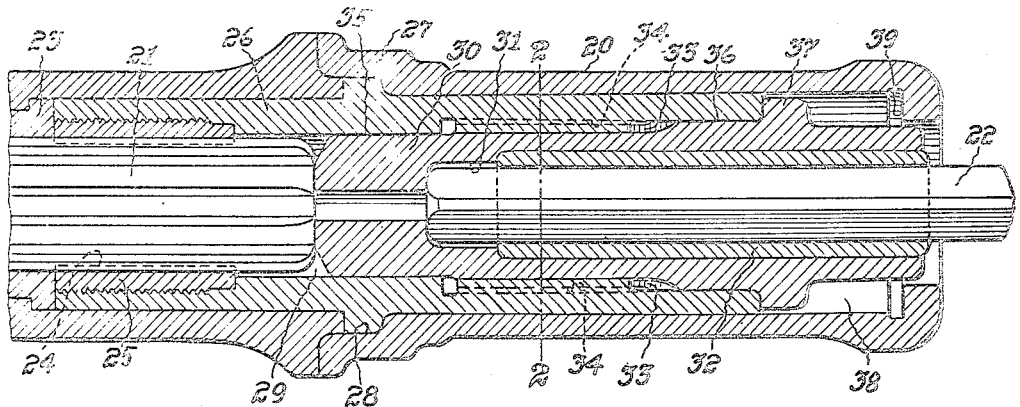
Figure 2:
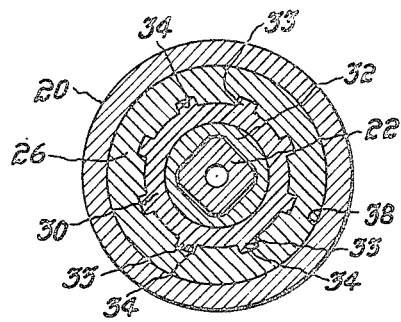

In the drawings accompanying this specification and in which similar reference numerals refer to similar parts, Figure 1 is a horizontal view, partly broken away, of the front end portion of a rock drill having the invention applied thereto, and Figure 2 is a transverse view taken through Figure 1 on the line 2—2.

Referring more particularly to the drawings, 20 designates the casing of the rock drill and 21 the front end portion of the stem of a piston reciprocable in the casing 20 for actuating a working implement 22.

The stem 21 is guided by a bushing 23 and is fluted for interlocking engagement with ribs 24 in a sleeve 25 threaded into the rearward end of a chuck 26 in the casing 20. The chuck 26 is thereby interlockingly connected with the piston stem 21 for rotation therewith. The piston itself may be rotated by any suitable and well known means, as for example a rifle bar (not shown). Intermediate the ends of the chuck is an external flange 27 that lies within a groove 28 in the casing 20 to hold the chuck against endwise movement, and the bore 29 in the chuck 26 is of slightly larger diameter than the piston stem 21 which reciprocates therein to strike against an anvil block 30 serving to transmit the blows of the piston to the working implement 22.

The anvil block is in the form of an elongated cup-shaped member having a deep socket 31 that opens from the forward end of the anvil block for the accommodation of the working implement, the rearward end of which abuts the buttom of the socket. Within the socket 31 is a bushing 32 that is preferably press-fitted into the anvil block to serve as a bearing surface for the working implement and may be readily replaced whenever it becomes worn unduly. The interior of the bushing 32 is shown as being of square section to conform with the shape of the working implement so that the latter will rotate with the anvil block.

The anvil block 30 is freely slidable endwise with respect to the chuck 26 and the working implement, and on its outer surface are longitudinally extending ribs 33 that lie in flutes 34 in the chuck 26 to prevent rotary movement of the anvil block with respect to the chuck. The portions 35 and 36 of the peripheral surface of the anvil block lying respectively rearwardly and forwardly of the ribs 33 constitute bearing surfaces and have a slide fit on the surface of the bore 29.

On the forward portion of the anvil block is an external flange 37 that is movable within a space 38 in the front end of the casing 20 and overlies the front end of the chuck which it may abut as well as the opposed end wall 39 of the casing for limiting endwise movement of the anvil block.

In practice, the above described invention has been found to effect a material saving in the cost of maintenance of rock drills employing anvil blocks for transmitting the blow of the hammer piston to the working implement. Constructed in accordance with the practice of the invention, the anvil block may be provided with ample bearing surfaces that may be advantageously spaced to prevent vibratory movement of the anvil block within the chuck and a consequent spalling of the striking surface of the piston. A further highly desirable advantage of the present invention is that, owing to the use of a single member for guiding and rotating the working implement and for transmitting blows thereto, the number of parts of the rock drill is materially reduced and all the wear resulting from the action of the working implement is confined to one part only.

I claim:

1. In a rock drill, a casing, a piston reciprocable and rotatable in the casing, a chuck in splined engagement with the piston to rotate therewith, an anvil block slidable in the chuck to receive the blows of the piston and having a socket, means on the chuck and the anvil block in slidable interlocking engagement for preventing relative rotation therebetween, a working implement to receive the blows transmitted by the anvil block and being freely slidable in the socket, and a shoulder on the anvil block for cooperation with the chuck and the casing to limit endwise movement of the anvil block.

2. In a rock drill, a casing, a working implement, a piston reciprocable and rotatable in the casing, a chuck in splined engagement with the piston to rotate therewith, an anvil block slidable in the chuck and rotatable therewith to receive the blows of the piston and having a socket, a replaceable bushing in the socket to slidably receive the working implement, and a flange on the anvil block for cooperation with the chuck and the casing to limit endwise movement of the anvil block.

WILLIAM A. MORRISON.

REFERENCES CITED

The following references are of record in the file of this patent:

UNITED STATES PATENTS

| Number | Name | Date |
| --- | --- | --- |
| 927,940 | Brothers | July 13, 1909 |
| 1,708,975 | Skaer | Apr. 16, 1929 |
| 1,832,471 | Nell | Nov. 17, 1931 |
| 1,848,340 | Gilman | Mar. 8, 1932 |
| 2,255,423 | Huffman | Sept. 9, 1941 |